March 23, 1943.  J. H. WILSON  2,314,675
LAWN SPRINKLER
Filed Sept. 6, 1941  3 Sheets-Sheet 1

Inventor
John H. Wilson
By Clarence A. O'Brien
Attorney

March 23, 1943.　　　J. H. WILSON　　　2,314,675
LAWN SPRINKLER
Filed Sept. 6, 1941　　　3 Sheets-Sheet 2
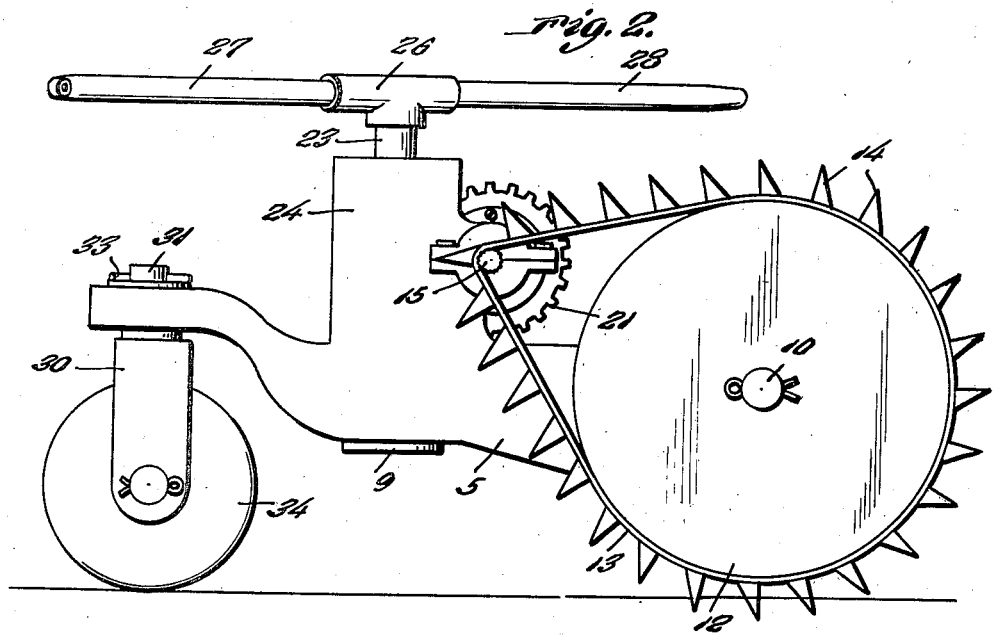
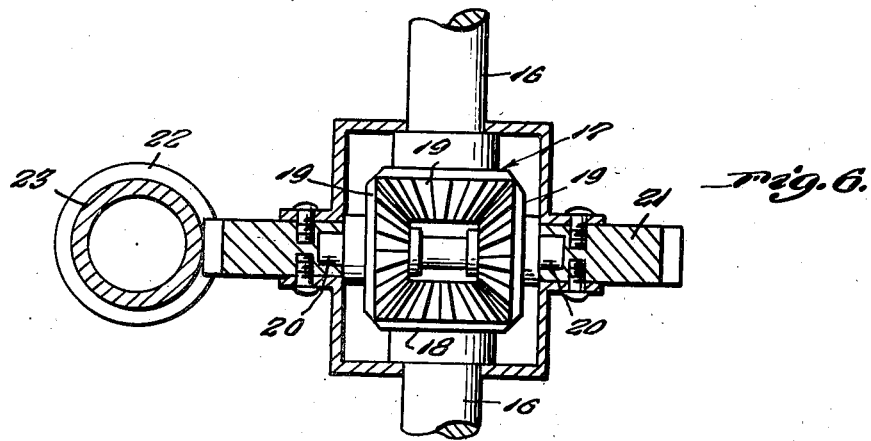
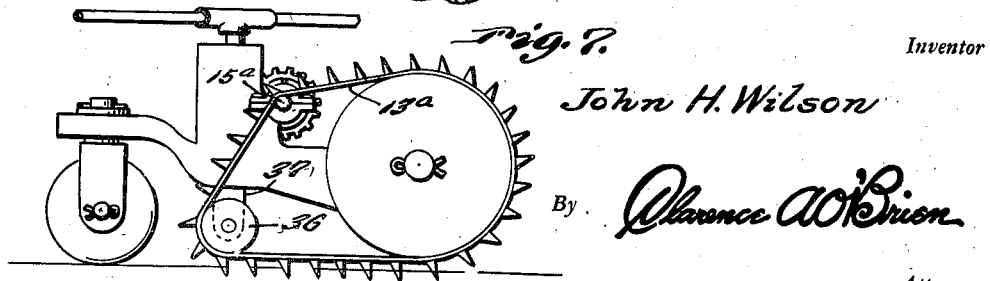
Inventor
John H. Wilson
By Clarence A. O'Brien
Attorney March 23, 1943.　　　　J. H. WILSON　　　　2,314,675
LAWN SPRINKLER
Filed Sept. 6, 1941　　　　3 Sheets-Sheet 3

Inventor
John H. Wilson
By Clarence A. O'Brien
Attorney

Patented Mar. 23, 1943

2,314,675

UNITED STATES PATENT OFFICE 2,314,675

LAWN SPRINKLER

John H. Wilson, North Platte, Nebr., assignor to Automotive Sprinkler Company, North Platte, Nebr.

Application September 6, 1941, Serial No. 409,888

2 Claims. (Cl. 299—50)

This invention relates to new and useful improvements in lawn sprinklers and more particularly to an automotive traveling sprinkler, the same being an improvement on my Patent No. 2,152,425, issued March 28, 1939.

The principal object of the present invention is to provide an automotive type lawn sprinkler which will have fewer moving parts and have these parts more compact and accessible than can be found in any machine of this character now on the market.

Another important object of the invention is to provide a sprinkler machine of the character stated which is positive acting and substantially fool-proof in operation.

Other objects and advantages of the invention will become apparent to the reader of the following specification.

In the drawings:

Figure 2 is a side elevation.

Figure 6 is a horizontal sectional view taken substantially on line 6—6 of Figure 3.

Figure 7 is a side elevational view of a slightly modified form of the machine.

Figures 1, 4:
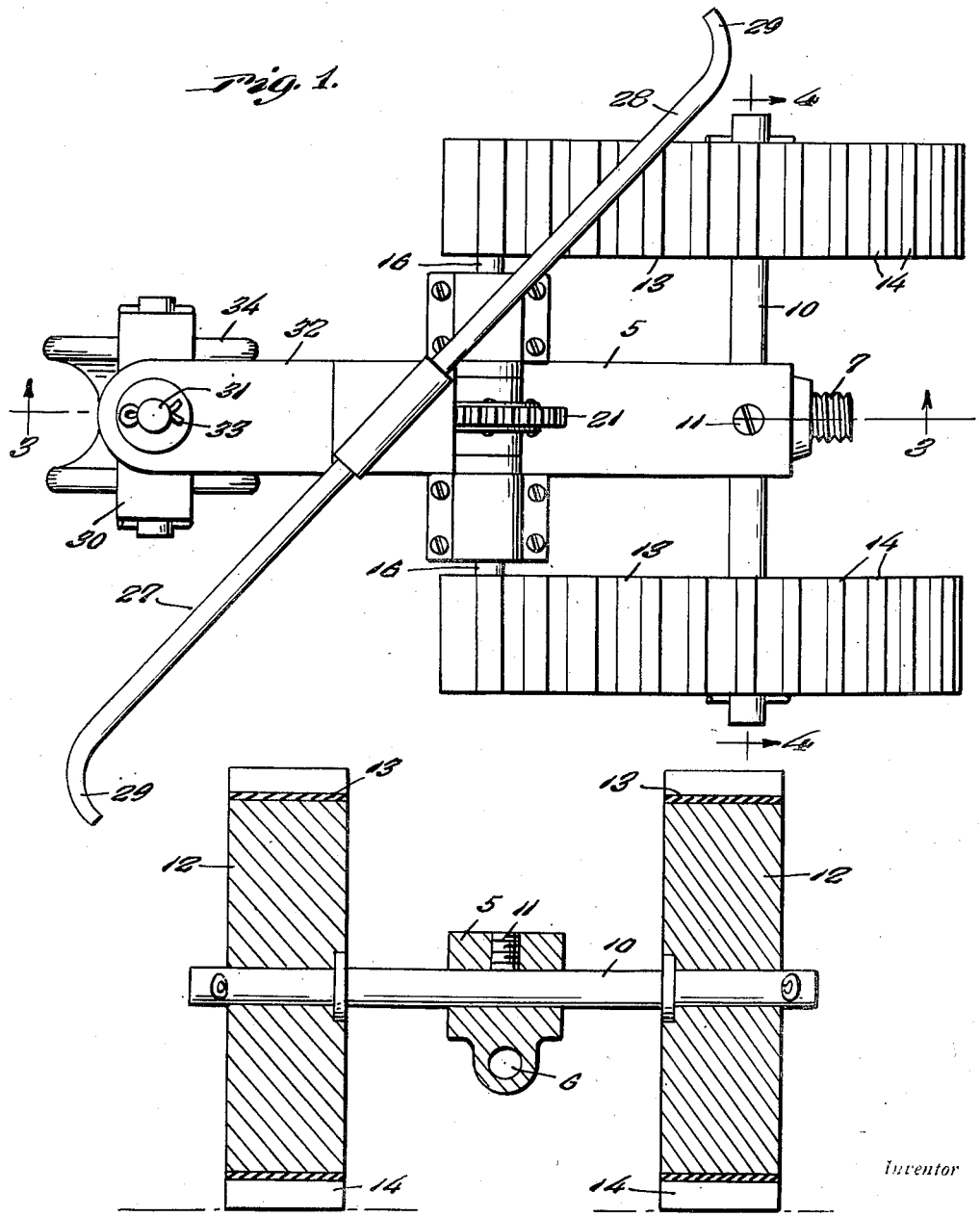
Figure 1 represents a top plan view of the machine.
Figure 4 is a cross-sectional view taken substantially on line 4—4 of Figure 1.
Figure 3:
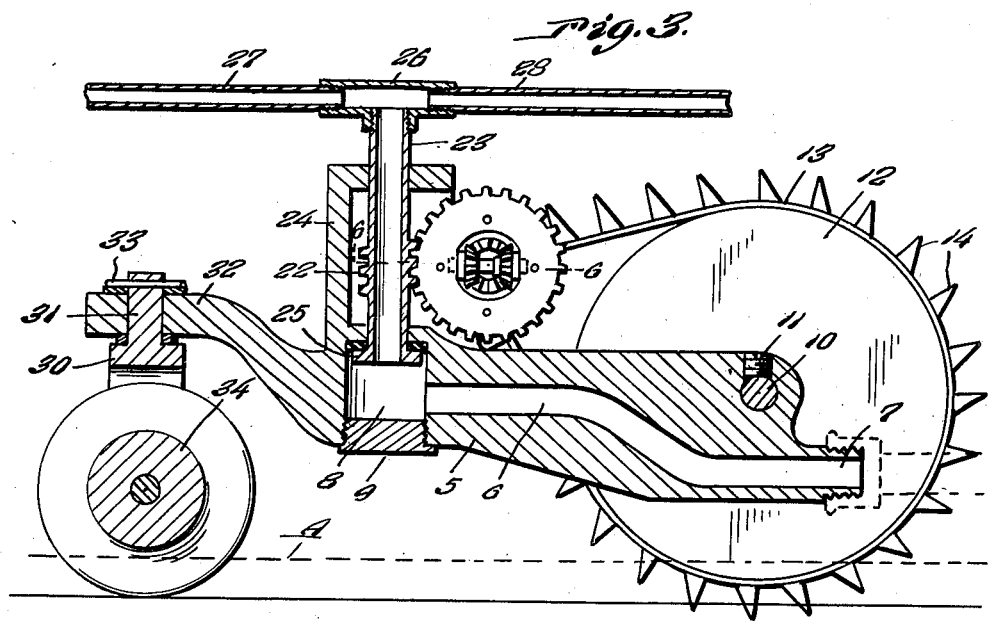
Figure 3 is a longitudinal sectional view on line 3—3 of Figure 1.
Figure 5:
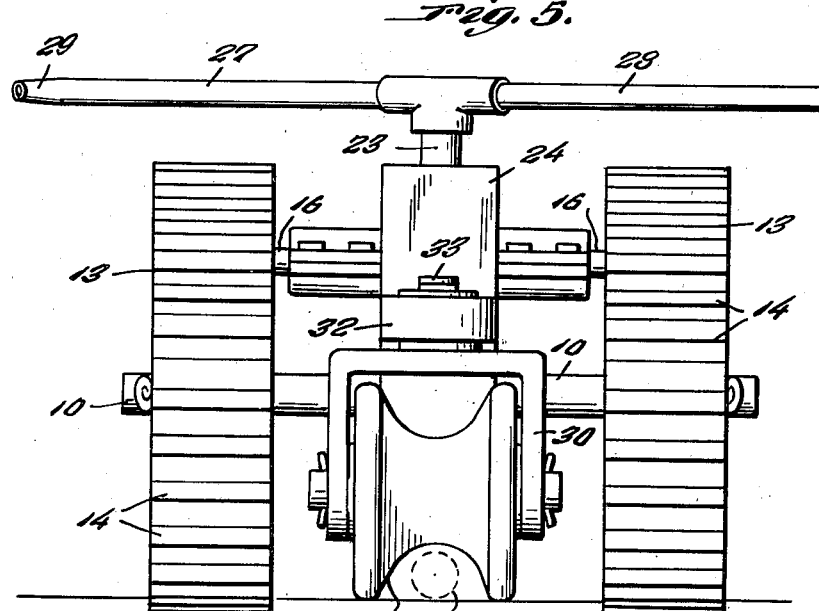
Figure 5 is a front elevational view of the machine.

Referring to the drawings wherein like numerals designate like parts, it can be seen that the numeral 5 denotes an elongated narrow body structure having a duct 6 extending forwardly therein from a threaded hose attachable nipple 7 at the rear end thereof. At the forward portion of the body 5 is a chamber 8 normally closed by plug 9 at the lower end thereof and into this leads the duct 6.

A shaft 10 is disposed through the rear portion of the body 5 and is held by set screw 11 against rotation or longitudinal shifting. Master wheels 12 are provided on the ends of the shaft 10 and each of these master wheels 12 has a traction belt 13 trained over the same and provided with spurs 14. These spurs are of a shape and size that will permit sufficient penetration of the lawn to cause traction of the machine.

Each of these belts 13 is further trained over a corrugated roll 15 on a corresponding shaft 16. These shafts lead to a differential mechanism generally referred to by numeral 17 and shown in Figure 6 in detail. In this differential mechanism, each of the shafts 16 is provided with a beveled gear 18 and these gears 18 mesh with beveled gears 19, 19 mounted on pins 20 journaled in a ring gear 21 which meshes with a worm structure 22 on a vertical hollow shaft 23, which shaft extends downwardly through a case structure 24 to terminate in a head structure 25 in the upper portion of the chamber 8. Suitable packing glands can be provided between this head and upper end of the chamber 8.

The upper end of the hollow shaft 22 has a T-head 26 from which extend hollow radial arms 27, 28 each provided with a curved discharge and constructed tip 29.

A yoke 30 has a shank member 31 extending upwardly through an opening in the forward offset portion 32 of the body 5 and a pin or cotter key 3 is provided and disposed through the upper end of the shank 31 to prevent displacement of the shank from the body extension 32. A grooved cast wheel 34 is provided and suitably mounted in the yoke 30, and if desired, this wheel may ride along the hose 34 which supplies water to the duct 6, thus using the hose as a guide for the machine.

Obviously, when the water supply is turned on the pressure of the water will cause rotation of the radial arms 27, 28 and the worm 22 will drive the gear 21 and in turn the shafts 16, 16 of the differential mechanism which in turn will drive the rolls 15 and the traction belt 13. Thus, the action of the sprinkler will drive the machine until such time as the water supply is turned off.

A modification of the invention is shown in Figure 7 where idler rolls 36 are supported by a bracket or brackets 37 beneath the body of the machine to accommodate the traction webs 13a in addition to the corresponding corrugated rolls 15a.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A sprinkler machine comprising a body, a pair of traction wheels, traction belts disposed over the wheels, a conduit for water under pressure, a vertically disposed and rotary hollow shaft in communication with the conduit, sprinkler arms projecting from the upper end of the shaft, drive means between the shaft and the traction belts, said drive means consisting of a differential gear mechanism including a ring gear and a worm on the shaft meshing with the ring gear, and a pair of differential connected shafts each provided with a roll over which one of said belts is trained.

2. A sprinkler comprising an elongated body having in the forward portion thereof a pressure chamber open at its top, and a supply conduit in said body extending rearwardly from said chamber and opening onto the rear end of the body for the introduction of water from a hose line thereinto, an open back casing arising from said body above said chamber, a hollow vertical shaft journaled in said casing and communicating at its lower end with said chamber, said shaft having a worm section thereon within said casing, sprinkler arms on the upper ends of said shaft for rotating the same, a pair of rear traction wheels, and means to drive said wheels by said worm including a worm wheel mounted on the body above the same to extend into said casing and mesh with said worm.

JOHN H. WILSON.